UNITED STATES PATENT OFFICE.

NATHAN W. LANE, OF MENDOCINO, CALIFORNIA.

IMPROVEMENT IN WASHING-FLUIDS.

Specification forming part of Letters Patent No. 141,364, dated July 29, 1873; application filed March 31, 1873.

*To all whom it may concern:*

Be it known that I, NATHAN W. LANE, of Mendocino city and county, State of California, have invented an Improved Washing-Fluid; and I do hereby declare the following description and accompanying drawings are sufficient to enable any person skilled in the art or science to which it most nearly appertains to make and use my said invention or improvement without further invention or experiment.

My invention relates to an improved fluid for cleansing and washing purposes.

To make my washing-fluid I employ the following ingredients in the proportions: Refined potash, one (1) pound; carbonate of potash, one-half ($\frac{1}{2}$) ounce; liquor of ammonia, one-half ($\frac{1}{2}$) ounce; bicarbonate of soda, one-half ($\frac{1}{2}$) ounce.

To make the fluid I first pour upon the carbonate of potash one quart of boiling water, and then add the carbonate of potash. After the mixture has cooled sufficiently I add the bicarbonate of soda and put it in a glass or earthen vessel, after which I add the liquor of ammonia, and cork the vessel tightly.

To use the fluid, I add one gallon of warm water to the above-described mixture, thus providing a detersive fluid or compound of extraordinary strength, which can not only be used for ordinary cleaning purposes, but for cleaning wearing apparel which has become soiled with grease, or for cleaning printers' ink from type rollers and cylinders, kerosene or turpentine, and other like purposes, where a very strong fluid is required.

Having thus described my invention, what I claim, and desire to secure by Letters Patent, is—

A washing-fluid composed of the ingredients above enumerated, compounded in the proportions above specified.

In witness whereof I hereunto set my hand and seal.

NATHAN WILLIAM LANE. [L. S.]

Witnesses:
W. H. KELLY,
ALEX. McCALLUM.